United States Patent [19]

Leopold et al.

[11] Patent Number: 5,774,787
[45] Date of Patent: Jun. 30, 1998

[54] INTERFERENCE MITIGATION SYSTEM FOR PROTECTING RADIO ASTRONOMY AND METHOD OF USING SAME

[75] Inventors: Raymond Joseph Leopold, Tempe; Keith Andrew Olds, Mesa; Brian Michael Daniel, Phoenix, all of Ariz.

[73] Assignee: Motorola, Inc., Schaumburg, Ill.

[21] Appl. No.: 349,575

[22] Filed: Dec. 5, 1994

[51] Int. Cl.⁶ .................................................. H04B 7/185
[52] U.S. Cl. ........................ 455/12.1; 455/54.1; 455/63; 455/67.3
[58] Field of Search ................................. 455/12.1, 13.1, 455/13.2, 33.1, 34.1, 54.1, 56.1, 63, 67.1, 67.3

[56] References Cited

U.S. PATENT DOCUMENTS

| | | | |
|---|---|---|---|
| 5,121,409 | 6/1992 | Goss | 455/12.1 |
| 5,287,550 | 2/1994 | Fennell et al. | 455/56.1 |
| 5,327,572 | 7/1994 | Freeburg | 455/13.2 |
| 5,442,805 | 8/1995 | Sager et al. | 455/33.1 |
| 5,548,800 | 8/1996 | Olds et al. | 455/54.1 |

OTHER PUBLICATIONS

Klandrud et al "Beacon Control of Radio Transmitters to Reduce Radio Frequency Interference" Motorola's Technical Developments, vol. 16, Aug. 1992.

*Primary Examiner*—Reinhard J. Eisenzopf
*Assistant Examiner*—Thanh Le
*Attorney, Agent, or Firm*—Kevin K. Johanson

[57] ABSTRACT

A constellation (12) of satellites (14) distributed around the earth supports satellite-based communication system (10) involved in global communication of subscriber units (24). Subscriber units (24) may potentially transmit from any location on earth. Some locations such as radio astronomy sites (28) may be interfered with by nearby transmissions from subscriber units (24) or transmissions from satellites (14). Subscriber units (24) located within a potentially interfering proximity to radio astronomy sites are prohibited from transmitting potentially interfering signals by reception of a non-interfering control signal transmitted by a radio astronomy special equipment located at radio astronomy sites. A radio astronomy special equipment (44) repeatedly transmits to a subscriber unit (24) a control signal synchronous with a control signal of a servicing satellite. The radio astronomy special equipment control signal (46), (48), and (54) is compatible with a subscriber unit's communication receiver.

7 Claims, 7 Drawing Sheets

INTERFERENCE MITIGATION SYSTEM FOR PROTECTING RADIO ASTRONOMY AND METHOD OF USING SAME

RELATED INVENTIONS

The present invention is related to the following invention:

"Satellite Telecommunication System With Apparatus For Protecting Radio Astronomy And Method Of Using Same", having Ser. No. 08/254,012, filed Jun. 3, 1994, U.S. Pat. No. 5,548,800, and assigned to the assignee of the present invention.

FIELD OF THE INVENTION

The present invention relates generally to satellite-based communications, and, more particularly, to protection of radio astronomy sites from interfering transmissions by subscriber units.

BACKGROUND OF THE INVENTION

Radio astronomy is one of the most sensitive methods of astronomy in operation today. Radio astronomy employs large antennas or arrays of antennas to gather very faint radio frequency signals emitted by celestial objects. These faint signals are then coherently combined to produce a resolvable image.

While this technique can resolve objects invisible to the human eye or even large aperture optical telescopes, radio astronomy is very susceptible to interference. Near-field competing spectrum devices such as cellular phones and other transmitters, although generally portable and low-power, produce substantially higher received power levels than cosmos-attenuated signals generated many light years away.

To combat the interference problems associated with fixed-site transmitters, radio astronomy sites are generally located in remote areas to allow attenuation of manmade interfering signals. Radio astronomy has also enjoyed restricted frequency sharing of radio astronomy bands. However, the surge in portable telephony with its frequency encroachment and satellite-based communication systems present additional challenges that cannot be solved by further isolating radio astronomy sites.

A typical radio astronomy site combats the problems as described above by disallowing the transmission of potentially interfering signals within a prescribed boundary. This prevention technique breaks down, however, as portable transmitters become more powerful and utilize additional frequency spectrum.

One solution known in the prior art is to generate a local beacon signal at the radio astronomy site. This local beacon emits a receivable signal throughout the vicinity of the radio astronomy site. This solution is bulky and expensive because of the additional special receiver required to detect a special beacon signal.

Thus, what is needed is a beacon system capable of providing beacon protection near a radio astronomy site, but not requiring special receivers.

Also, what is needed is an automatic method of scheduling a radio astronomy session to prohibit transmission of interfering signals within the vicinity.

Also, what is needed is a low-cost, effective method of providing beacon protection to a radio astronomy site that does not require additional subscriber unit receiver circuitry.

DESCRIPTION OF THE PREFERRED EMBODIMENT

Figure 1:
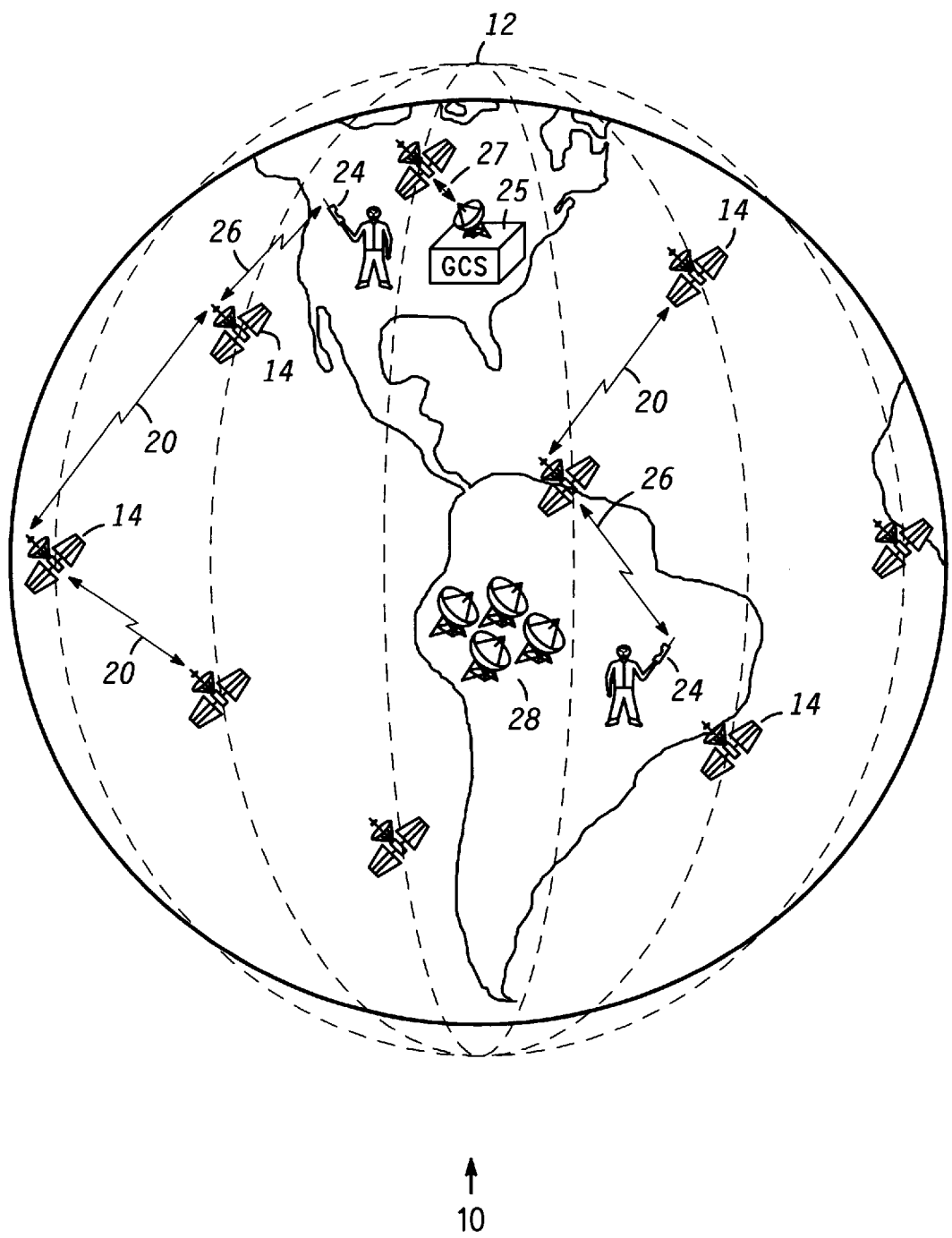
FIG. 1 depicts a global communication system, in accordance with an embodiment of the present invention.

FIG. 1 depicts a global telecommunication system, in accordance with an embodiment of the present invention. Satellite-based communication system 10 includes a constellation 12 consisting of multiple satellites dispersed around the earth. In a preferred embodiment, satellites 14 are in low-earth orbits. Satellites 14 communicate with each other through cross-links 20.

System 10 also includes subscriber units 24. Subscriber units 24 may be mobile, portable, or fixed location interfaces to satellite 14. Subscriber units 24 interface with satellites 14 using down-links 26. Communication signals transmitted from subscriber unit 24 to satellite 14 are routed, if necessary for proper delivery, to adjacent satellites 14 through cross-links 20.

Ground Control Station 25 receives messages such as a service request for mitigating electromagnetic interference from any of a myriad of sources such as conventional telephone requests, mail, etc. Ground Control Station 25 then converts these message requests into communication formats for transmission throughout system 10 using up-links 27.

Radio astronomy site 28 receives cosmic signals from directed points in space. Radio astronomy site 28 historically has been remotely located away from interfering signals. With subscriber units 24 becoming mobile and ubiquitous, and a satellite-based communication system 10 providing near global coverage, interference at radio astronomy site 28 from subscriber unit 24 is possible. If subscriber unit 24 or satellites 14 transmit near radio astronomy site 28, interference may occur with the received cosmic signals, causing false readings during a radio astronomy session.

Figure 2:
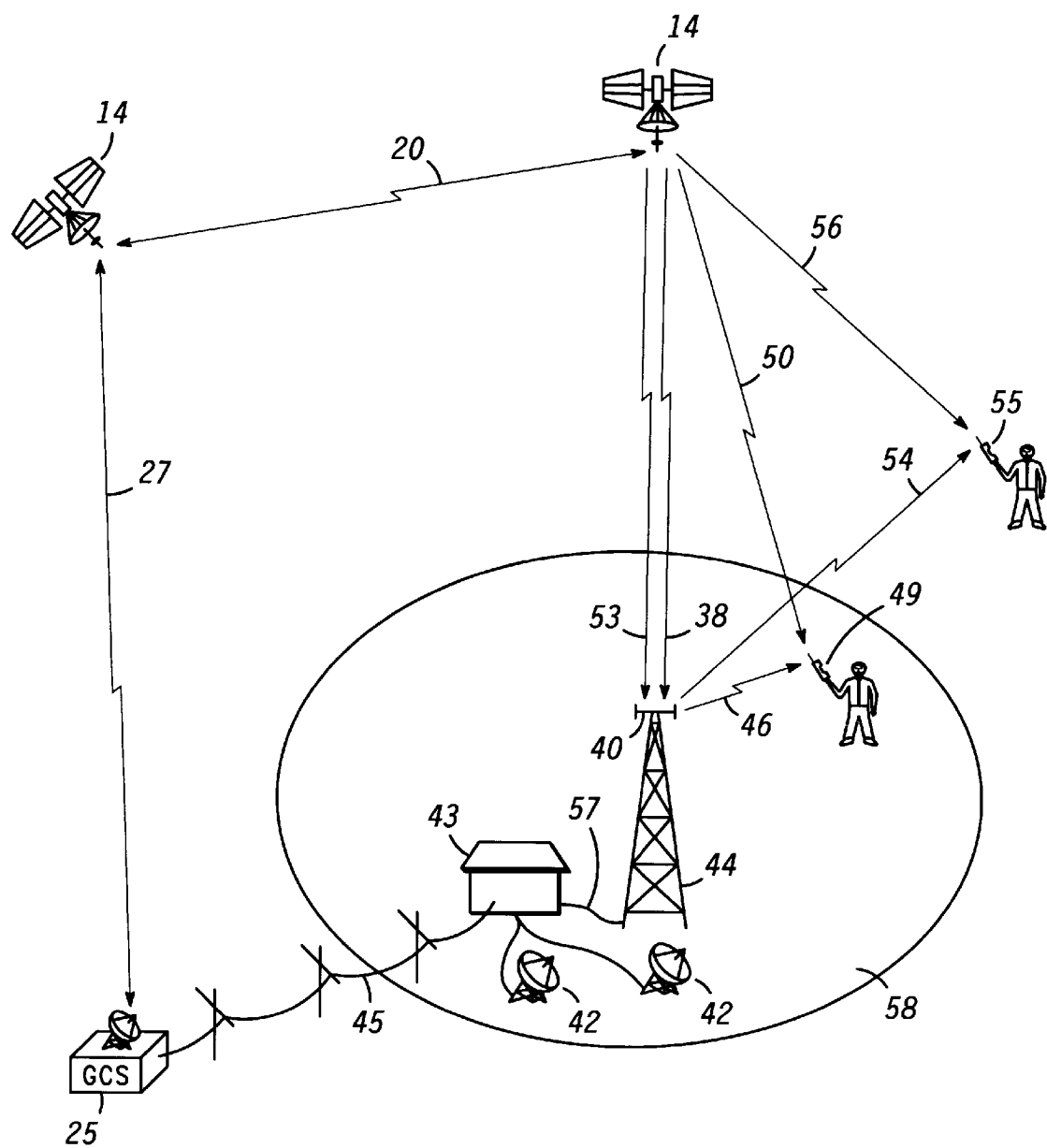
FIG. 2 shows typical communication paths between a ground control station, satellites, subscriber units and a radio astronomy site, in accordance with an embodiment of the present invention.

FIG. 2 shows typical communication paths between a ground control station, satellites, subscriber units and a radio astronomy site, in accordance with an embodiment of the present invention. Satellites 14 orbit the earth, potentially communicating with subscriber units and 55. Satellite 14 also repeatedly broadcasts a common satellite control signal (whose signal paths to subscriber units 49 and 55 are indicated by reference numbers 50 and 56, respectively) to all subscriber units within its view. Each subscriber unit receives a satellite control signal 50 and 56 through a unique propagation path. Some propagation paths may be closer to satellite 14, and some will be further away.

Satellite control signal 50, 52, and 56 may contain general control information and instructions (see FIG. 5) for all subscriber units serviced by satellite 14, or specific control information and instructions for specific subscriber units serviced by satellite 14. Control information and instructions may contain information such as a specific subscriber unit's ID number. This ID number would alert and activate a subscriber unit into reception of an incoming call. Control information could also include a listing of available transmit frequencies available to subscriber units. Additionally, control information could also include coordinate location data of the transmitting satellite 14 for use by a subscriber unit in determining a preferred satellite with which to communicate.

Radio astronomy site 28 (FIG. 1) includes radio astronomy center 43 and radio astronomy antenna 42. Radio astronomy center 43 processes received cosmic signals from radio astronomy antenna 42. For effective radio astronomy, interfering frequencies must have sufficiently low power levels at radio astronomy site 28 (FIG. 1). Protection zone 58 defines an area wherein transmitting subscriber units would produce sufficiently powerful signals to cause interference at radio astronomy site 28 (FIG. 1). One skilled in the art would understand that the size of protection zone 58 varies with the transmit power level of subscriber units. In other words, subscriber units capable of transmitting higher power levels must be further away from radio astronomy site 28 to prevent interference. Therefore, protection zone 58 would need to be larger. The radius of protection zone 58 may be adjusted by varying the power level of radio astronomy special equipment (RASE) 44.

Installation and activation of radio astronomy special equipment 44 at radio astronomy site 28 (FIG. 1) establishes a protection zone 58. Radio astronomy special equipment 44 connects to center 43 through control interface 57. Control interface 57 performs general functions such as communicating to radio astronomy center 43 the beginning of mitigation services and the synchronization signal defining the mitigation duty cycle. The radio astronomy special equipment transmits a control signal, also known as a beacon control signal, which is designed to not interfere with radio astronomy observations. One skilled in the art would understand that control interface 57 provides status and control signals associated with satellites 14 when they transmit.

Radio astronomy center 43 plans a radio astronomy session detailing by the beginning and duration of a radio astronomy session, and it requests mitigation services by communicating the session plan to ground control station 25 using one of many communication conduits 45 such as conventional telephone or even mail.

Ground control station 25 then generates a mitigation timetable as requested by radio astronomy center 43, schedules the transmission of the mitigation timetable and then transmits the timetable using up-link 27 to satellite 14. Satellite 14 then relays the mitigation timetable if necessary to other necessary satellites 14 using cross-links 20. Satellite 14 then transmits the timetable to radio astronomy special equipment 44 using communication channel 38.

Radio astronomy special equipment 44 monitors a communication channel 38 and receives the mitigation timetable from satellite 14. Radio astronomy special equipment 44 then stores the mitigation timetable and evaluates its contents, whereupon it schedules the activation of the mitigation services for the duration as contained in the timetable. Radio astronomy special equipment 44 continues to monitor a communication channel 38 for any subsequent messages while awaiting the arrival of the activation time.

When the time for a radio astronomy session arrives, radio astronomy special equipment 44 activates mitigation services. One step in the mitigation process is to synchronize radio astronomy special equipment 44 to satellite control signal 53. Radio astronomy special equipment 44 transmits a common radio astronomy special equipment control signal through radio astronomy special equipment antenna 40 to all subscriber units within its view. The radio astronomy special equipment control signal is essentially identical in modulation and format to the satellite control signal. However, the information transmitted within radio astronomy special equipment control signal contains data values such as satellite coordinates that allow a subscriber unit to distinguish between a satellite and radio astronomy special equipment. This distinction informs a subscriber unit that it is within a protection zone thus severely limiting its transmit function.

In a preferred embodiment, the satellite control signal, the satellite communication signals and the radio astronomy special equipment control signal are broadcast as periodic bursts followed by a fixed-duration time delay. This time delay defines a mitigation period (duty cycle) wherein a radio astronomy center 43 may sample astronomy data. Radio astronomy center 43 receives timing information describing this duty cycle or period through control interface 57 which communicates to radio astronomy center 43 the beginning of mitigation services and the synchronization signal defining the mitigation duty cycle wherein interference is mitigated.

In the preferred embodiment, the satellite control signal is separated in frequency from other satellite communication signals by Doppler guard bands which are not used for transmissions. These guard bands allow the subscriber units to receive the control signals without interference when their frequency is shifted due to the Doppler effect.

The radio astronomy special equipment control signals are transmitted in these Doppler guard bands. This allows the control signal to be transmitted at low power. Since the subscriber units must be capable of receiving the satellite control signal for any Doppler shift within the possible Doppler shift range for the system, by transmitting two control signals one in the high frequency Doppler guard band and one in the low frequency Doppler guard band, the radio astronomy special equipment assures that the subscriber units will receive at least one of the radio astronomy special equipment control signals without interference from the satellite control signal.

Radio astronomy control signal (whose signal paths to subscriber units 49 and 55 are indicated by reference numbers 46 and 54, respectively) contains general control information and instructions (see FIG. 5) for all subscriber units. Such information and instructions limit nearby subscriber unit's functionality because the radio astronomy special equipment control signal is transmitted more frequently than the satellite control signal. Subscriber units within protection zone 58 accept radio astronomy control signal as their control signal rather than a slightly later occurring satellite control signal.

Radio astronomy special equipment control signal 46 and 54 attenuates as it propagates away from radio astronomy special equipment antenna 40. Radio astronomy control signals contain subscriber unit transmission-limiting information. Radio astronomy special equipment control signal 46, as received by subscriber unit 49 within protection zone 58, dominates satellite control signal 50 by arriving earlier. Subscriber unit 49, within protection zone 58, captures a radio astronomy special equipment control signal 46 as transmitted through radio astronomy special equipment antenna 40. Subscriber unit 49 thus receives its control signal instructions and information from radio astronomy special equipment 44 rather than from satellite 14.

Subscriber unit 55 receives a radio astronomy special equipment control signal 54 which is greatly attenuated and a satellite control signal 56. Subscriber unit 55 captures non-transmission-limiting control signal information as transmitted by satellite 14. Thus a subscriber unit 55, which is outside protection zone 58, may transmit freely without interference to radio astronomy site 28.

Figure 3:
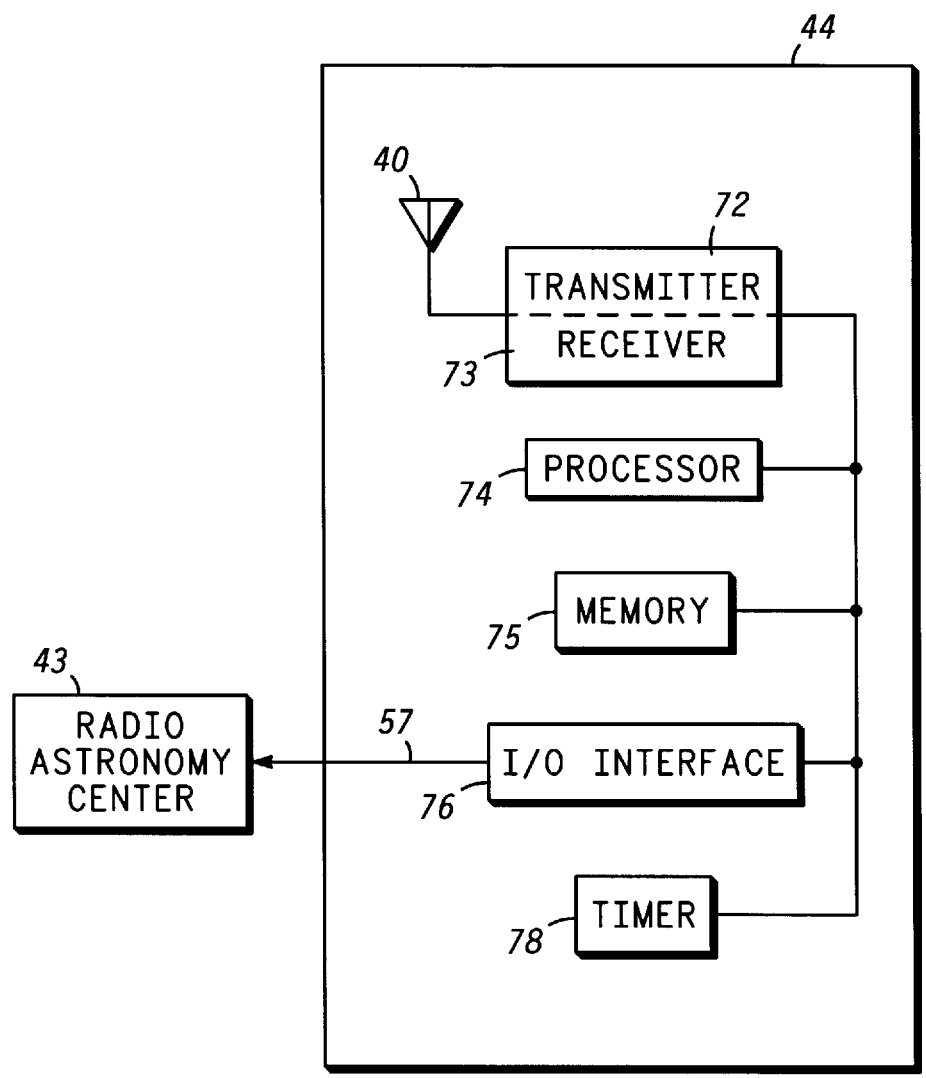
FIG. 3 shows a block diagram of a preferred embodiment of a radio astronomy special equipment (RASE) capable of receiving signals from a satellite and further capable of interfacing to a radio astronomy center and transmitting a radio astronomy control signal to a subscriber unit.

FIG. 3 shows a block diagram of a preferred embodiment of a radio astronomy special equipment capable of receiving signals from a satellite and further capable of interfacing to a radio astronomy center and transmitting a radio astronomy special equipment control signal to a subscriber unit.

Radio astronomy special equipment 44 interfaces with radio astronomy center 43 through a control interface 57. Control interface 57 connects to I/O interface 76 and performs general functions such as communicating to radio astronomy center 43 the beginning of mitigation services and the synchronization signal defining the mitigation duty cycle. I/O interface 76 interfaces to processor 74.

Radio astronomy special equipment 44 also comprises radio astronomy special equipment antenna 40, and a transceiver comprising a receiver 73 and transmitter 72. Radio astronomy special equipment antenna 40 may be any suitable antenna capable of emanating and receiving control and communication frequencies. Radio astronomy special equipment antenna 40 must also be capable of propagating the desired pattern to create a protection zone 58 that is suitable.

In a preferred embodiment, radio astronomy special equipment 44 includes a receiver 73. Receiver 73 monitors communication channel 38 (FIG. 2) and receives the mitigation timetable from satellite 14. Radio astronomy special equipment 44 then stores the mitigation timetable in memory 75 and processor 74 evaluates its contents, whereupon it schedules the activation of the mitigation services for the duration as contained in the timetable. Internal timer 78 compares a current time measurement with the scheduled activation time and performs timing during mitigation services. Receiver 73 continues to monitor communication channel 38 for any subsequent messages.

Transmitter 72 transmits a radio astronomy special equipment control signal 46 and 54. The power level of transmitter 72 may be adjusted to provide sufficient radio astronomy special equipment control signal levels to all subscriber units within protection zone 58.

Processor 74 and memory 75 are coupled together to perform sequencing and execution functions and to process and generate information contained in satellite and radio astronomy special equipment control signals. Timer 78 generates a delay period to processor 74 for transmission of subsequent delayed radio astronomy special equipment control signals. One skilled in the art would understand that known embodiments in the art of processor 74 have an internal timer 78.

Figure 4:
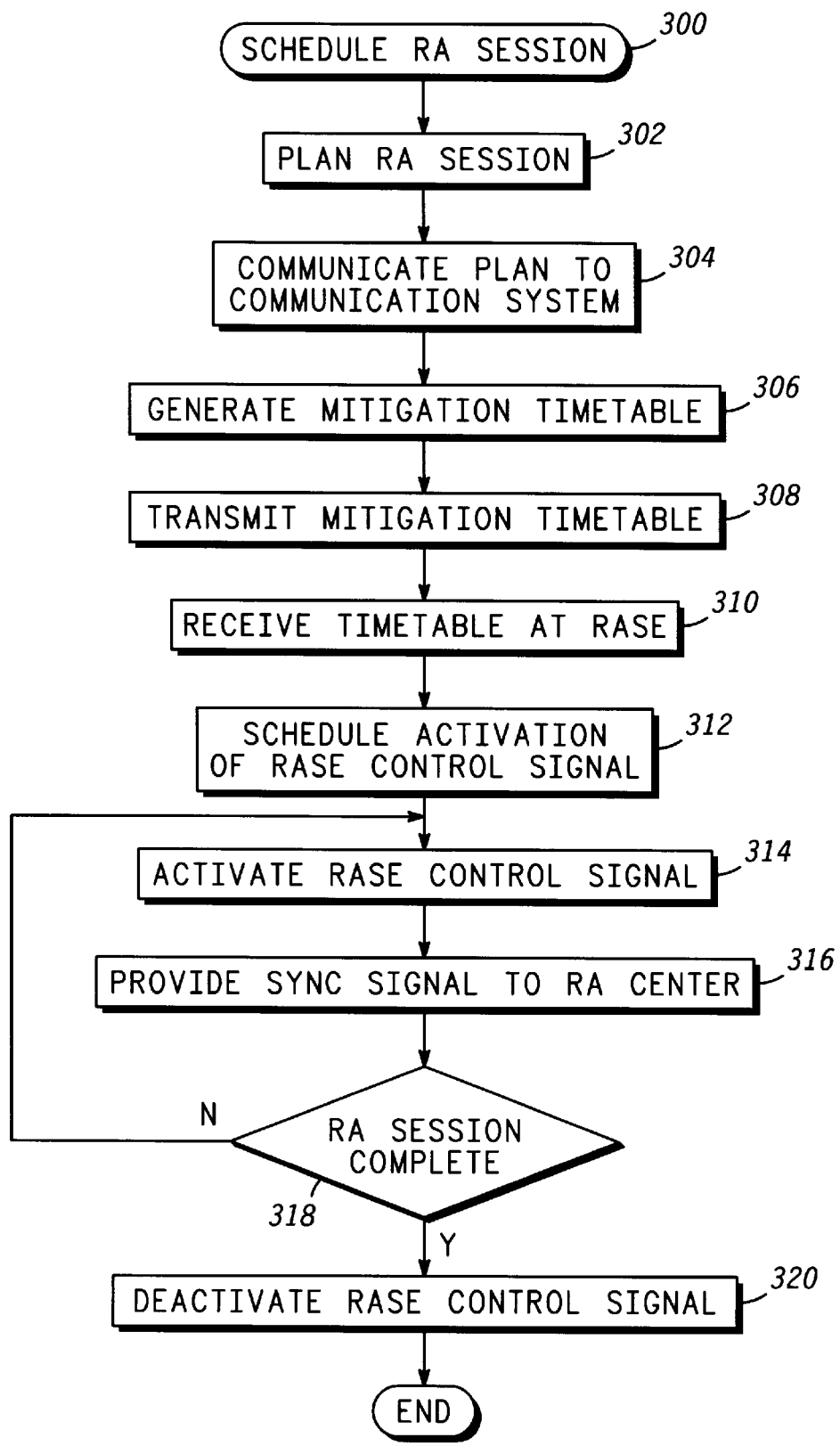
FIG. 4 shows a flowchart of an interference mitigation system's process of denying transmission opportunities to subscriber units while in a protection zone during a radio astronomy session, in accordance with a preferred embodiment of the present invention.

FIG. 4 shows a flowchart of an interference mitigation system's process of denying transmission opportunities to subscriber units while in a protection zone during a radio astronomy session, in accordance with a preferred embodiment of the present invention.

A procedure 300 provides interference mitigation services to a radio astronomy site during a scheduled session. A task 302 plans the desired radio astronomy session. Radio astronomy center details the beginning and duration of a radio astronomy session.

A task 304 then communicates a session plan from a radio astronomy center to a ground control station using one of many communication conduits such as conventional telephone or even mail.

In a task 306, a ground control station generates a mitigation timetable specifying the mitigation service plan as requested by a radio astronomy center.

Next, a task 308 transmits from a ground control station to a satellite a mitigation timetable. Satellites 14 then relay the mitigation timetable if necessary to other necessary satellites. A satellite then transmits the timetable to radio astronomy special equipment using a communication channel.

A task 310 receives a mitigation timetable from a satellite and stores it in a radio astronomy special equipment. The radio astronomy special equipment evaluates its contents.

A task 312 schedules the activation of the mitigation services for the duration as contained in the timetable.

A task 314, upon the arrival of the activation time, activates the mitigation service.

A task 316 provides a synchronization signal to communicate to radio astronomy center 43 the commencement of mitigation services and the synchronization signal defining the mitigation duty cycle.

A query task 318 tests for the completion of the scheduled session by analyzing the duration of a radio astronomy session. If the scheduled session has not completed, then sequencing returns to task 314. If query task 318 determines that the scheduled session is completed, then sequencing advances.

A task 320 deactivates the radio astronomy special equipment control signal and terminates the mitigation services.

Figure 5:
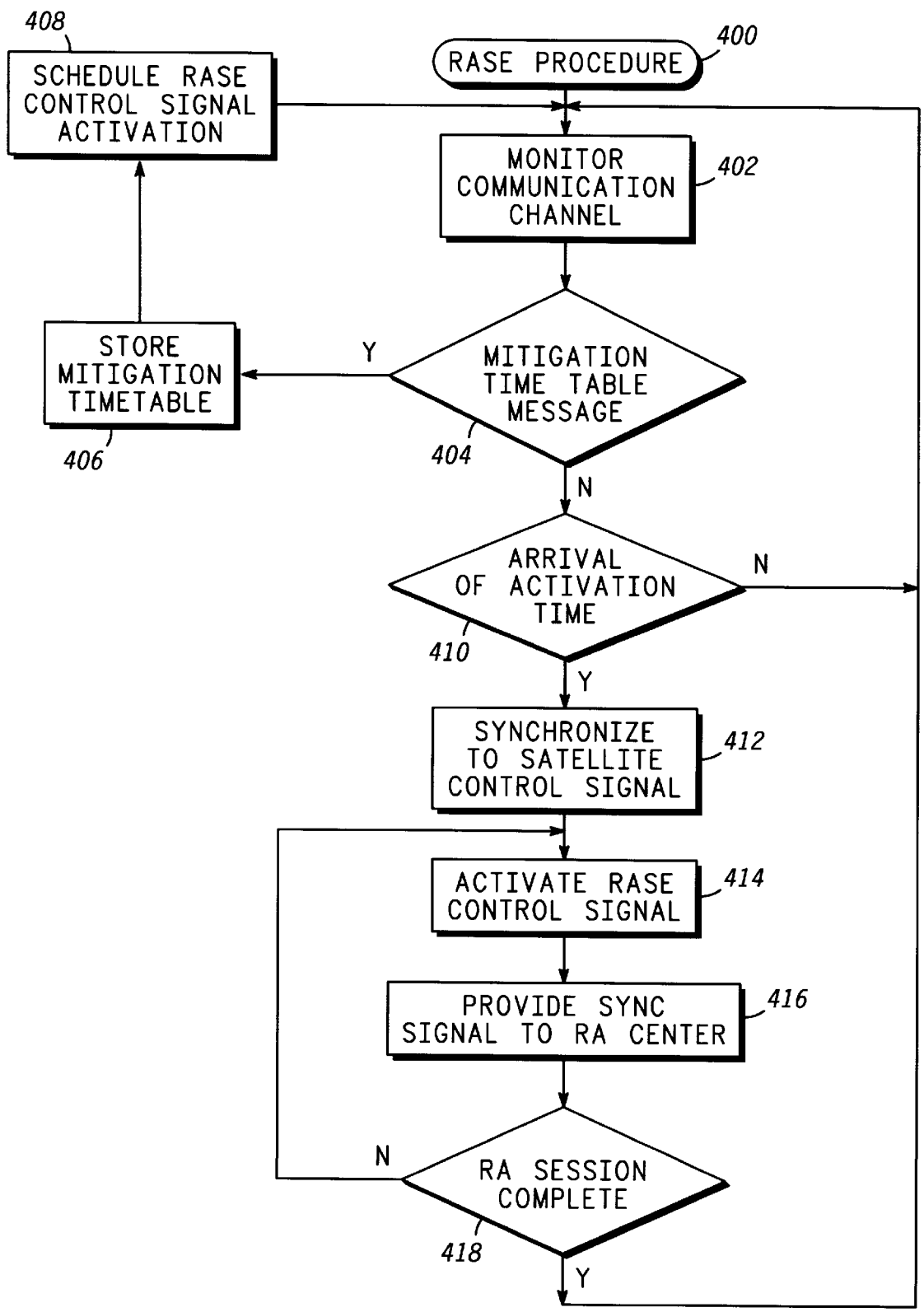
FIG. 5 shows a flowchart of a radio astronomy special equipment's process of monitoring requests for interference mitigation services and performing such requests, in accordance with an embodiment of the present invention.

FIG. 5 shows a flowchart of a radio astronomy special equipment's process of monitoring requests for interference mitigation services and performing such requests, in accordance with an embodiment of the present invention.

A procedure 400 provides mitigation services at a radio astronomy site during a radio astronomy session. A task 402 monitors a communication channel looking for a mitigation timetable as transmitted from a satellite. This timetable may be transmitted on a paging communication channel or a data communication channel as configured by the communication system.

A query task 404 analyzes messages on a communication channel to determine if any are destined for the radio astronomy special equipment. Upon the detection of a mitigation timetable message destined for the radio astronomy special equipment, processing passes to a task 406.

Task 406 stores the mitigation timetable for future evaluation in determining specifics related to a radio astronomy session such as start time and duration of the session.

A task 408 schedules the activation of mitigation services. This information is contained in the mitigation timetable as received through the communication channel. Following a task 408, the processing returns to task 402 for periodic monitoring of the communication channel. Task 402 examines the communication channel for the arrival of additional mitigation timetables or for modification to an existing timetable.

If a new or modified timetable is not detected in query task 404, then processing passes to query task 410. A query task 410 evaluates the mitigation timetable stored in task 406 to determine if the time for commencement of mitigation services has arrived. If it is not time for commencement of the session, then processing returns to task 402.

If the test in query task 410 is positive, then a task 412 synchronizes radio astronomy special equipment 44 to satellite control signal 53.

Next, a task 414 activates the radio astronomy special equipment control signal which contains transmission-limiting information to all subscriber units within a protection zone. This control signal is a periodic signal which will alert not only subscriber units activated prior to the commencement of the radio astronomy session, but also those that turn-on during the session.

A task 416 provides a synchronization signal communicating to the radio astronomy center the beginning of mitigation services and the synchronization signal defines the mitigation duty cycle.

A query task 418 evaluates the completion of the scheduled radio astronomy session. This is determined by evaluating the duration of the session described in the mitigation timetable. Upon completion of the radio astronomy session, processing returns to monitoring task 402.

Figure 6:
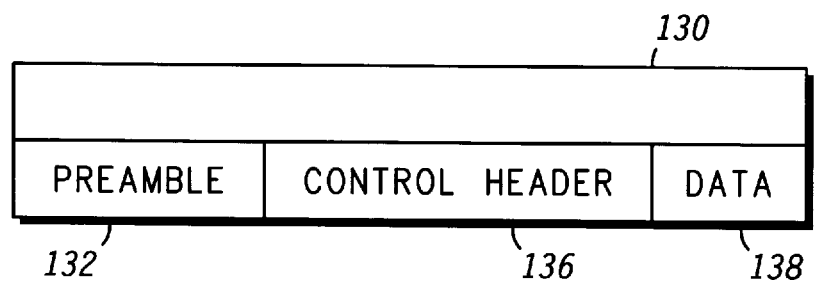
FIG. 6 shows a data format of a control signal used to control subscriber units, in accordance with an embodiment of the present invention.

FIG. 6 shows the data format of a control signal used to control subscriber units, in accordance with an embodiment of the present invention. Control signal 130 comprises a preamble 132, control header 136, and data 138. Preamble 132 provides a recognizable pattern allowing subscriber unit receivers to capture or acquire control signals. Preamble 132 may be a fixed period of unmodulated carrier as in a preferred embodiment or a modulated carrier having a detectable pattern.

Control header 136 may contain a predetermined unique word, command information such as coordinates of a transmitting satellite, available transmission frequencies, or a myriad of conceivable control or instructional information. In a preferred embodiment, control header 136 contains coordinates describing a location of a transmitting satellite. These coordinates are useful for a subscriber unit when communicating in a communication system. When a control signal contains unfavorable coordinates as determined by a subscriber unit, a subscriber unit will not attempt to access the system. This "disabling" of subscriber units within a protection zone prevents them from accessing the system, hence interfering with a radio astronomy session.

Control signal 130 also contains data 138. Data 138 may contain subscriber-specific IDs, or a variety of valuable information for subscriber units. In FIG. 2, subscriber unit 55 captures a satellite control signal 56 containing its ID, and it normally responds by transmitting to satellite 14.

In a preferred embodiment, radio astronomy special equipment 44, during a radio astronomy session, generates and transmits radio astronomy special equipment control signal 46 to subscriber unit 49. Radio astronomy special equipment control signal 46 is captured by subscriber unit 49 instead of satellite control signal 50. The control header 136 of radio astronomy special equipment control signal 46 either contains a control header 136 prohibiting subscriber unit 49 from transmitting or it may list no available transmission frequencies.

Figure 7:
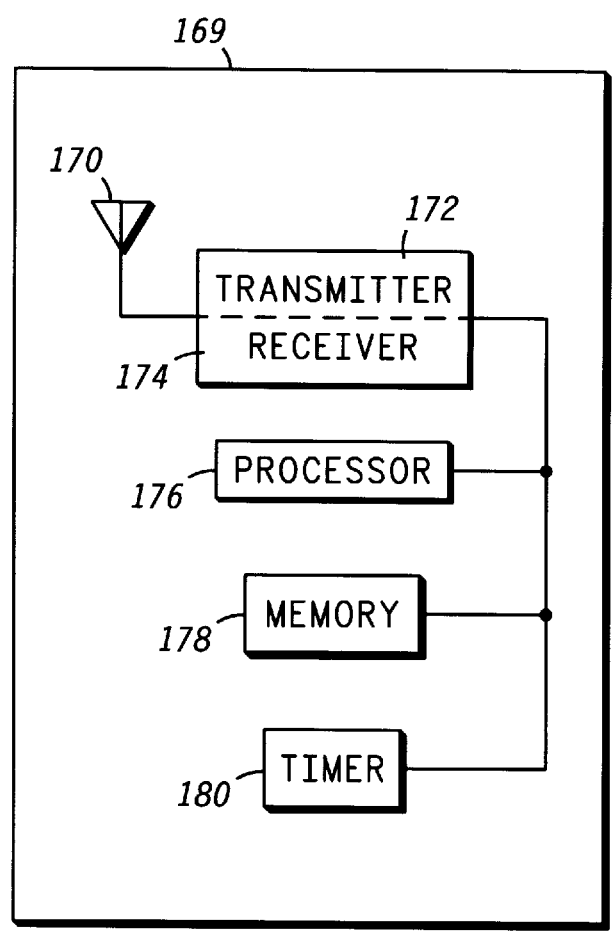
FIG. 7 shows a block diagram of a subscriber unit capable of receiving signals from a satellite or a radio astronomy special equipment, in accordance with an embodiment of the present invention.

FIG. 7 is a block diagram of a subscriber unit 169 capable of receiving signals from a satellite or a radio astronomy special equipment, in accordance with an embodiment of the present invention. A subscriber unit 169 comprises an antenna 170 for providing transmission and reception signal gain, and it also includes a transmitter 172 and receiver 174. Transmitter 172 transmits information to satellite 14 for routing in system 10. Receiver 174 receives satellite control signals among other signals. Receiver 174 is also capable of receiving radio astronomy special equipment control signals. This dual capability of receiver 174 simplifies a subscriber unit 169 by eliminating the need for a separate beacon specific receiver. Circuitry in a subscriber unit's receiver and processor enable a subscriber unit to extract information in a control channel whether it be a satellite control channel or a radio astronomy special equipment control channel. Other circuitry then prohibits or inhibits the transmission capability until proper information such as satellite location, available channels, and such are detected in a control channel.

Processor 176 and memory 178 are coupled together to perform sequencing and execution functions in a typical manner. Internal timer 180 generates a delay period to processor 176 for reception of subsequent control signals. One skilled in the art would understand that known embodiments in the art of processor 176 have an internal timer 180.

Figure 8:
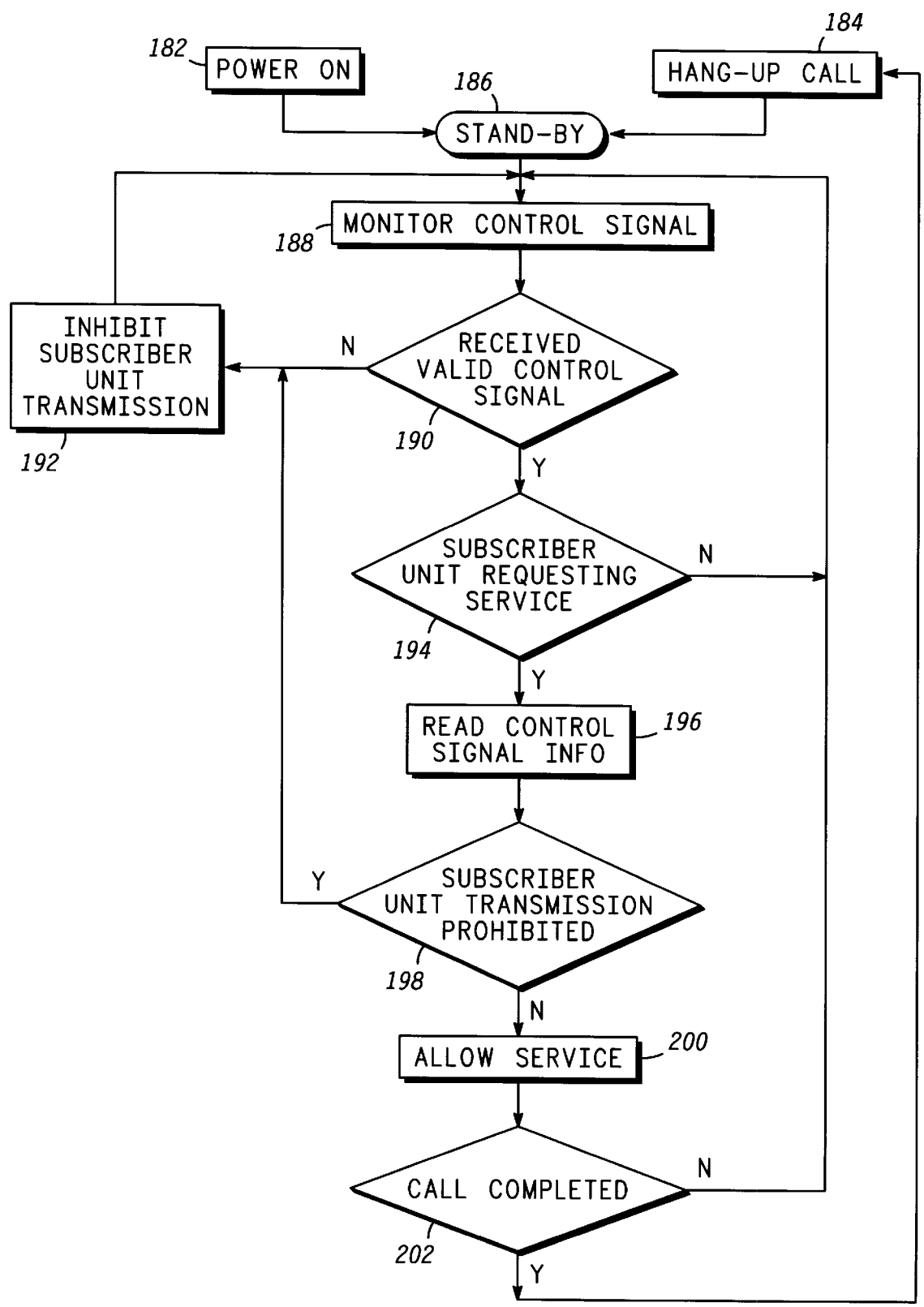
FIG. 8 shows a flowchart of a subscriber unit processing a received control signal, in accordance with an embodiment of the present invention.

FIG. 8 shows a flowchart of a subscriber unit processing a received control signal, in accordance with an embodiment of the present invention. A stand-by procedure 186 is entered from either completion of a power on task 182 or completion of a hang-up call task 184. When stand-by procedure 186 is first entered, a task 188 is performed to monitor a control signal 130 (FIG. 6). Task 188 includes capturing control signal 130 with receiver 174 by first acquiring preamble 132 and through other steps outside the scope of the present invention which are well known to those of skill in the art.

After task 188, a query task 190 determines whether a valid control signal was received. In the event that the subscriber unit detects two control signals, separated in frequency with the correct format for a valid control signal, the subscriber unit will determine if one of the signals is a radio astronomy special equipment control signal. If it is a radio astronomy special equipment control signal, the subscriber unit will inhibit transmissions. In a preferred embodiment, the subscriber unit uses the frequency separation and the fact that the radio astronomy special equipment control signal arrives a minimum of 2 ms before the satellite control signal to help synchronize its receiver to the satellite and radio astronomy special equipment signals. If received control signal information is not valid, then a task 192 inhibits transmission from subscriber unit 169. After task 192, processing returns to task 188 to monitor subsequent control signals.

If query task 190 determines that a control signal 130 was received and is valid, then processing passes to query task 194 to determine if subscriber unit 169 is requesting transmission service. If subscriber unit 169 is not requesting service, then processing returns to task 188 to monitor subsequent control signals.

If query task 194 determines that subscriber unit 169 is requesting service, then a task 196 performs additional processing on control signal 130 to extract control information. Following a task 196, a query task 198 determines whether control header 136 or data 138 prohibits transmission from subscriber unit 169. If transmission is prohibited, meaning that a radio astronomy control signal was received by subscriber unit 169, then a task 192 inhibits a subscriber unit 169 from transmitting.

If query task 198 determines that subscriber unit 169 is not prohibited from transmitting, meaning that a satellite control signal was received by subscriber unit 169, then a task 200 allows subscriber unit 169 transmission service to satellite 14 and access to system 10.

After task 200, a query task 202 determines whether subscriber unit 169 has completed its call. If the subscriber unit's call is not completed, then task 188 is performed to monitor and receive another control signal. If subscriber unit's call is completed, then a hang-up call task 184 hangs up the call and returns to stand-by procedure 186.

These and other changes and modifications which will be obvious to those skilled in the art are intended to be included within the scope of the present invention.

Thus there has been described herein a concept, as well as several embodiments including a preferred embodiment, of a radio astronomy protection system and method in which potentially interfering subscriber unit transmissions are inhibited within a transmission sensitive area defined as a protection zone.

Because the various embodiments of the radio astronomy protection system and method as herein-described do not require subscriber units to incorporate special beacon receivers, subscriber units perform with a significant improvement in cost and efficiency.

Additionally, since radio astronomy special equipment inhibits transmissions locally within a protection zone, subscriber unit communications outside of this zone are not impacted.

Furthermore, the above invention could protect any emission-sensitive regions such as airports, airplanes, non-participating geo-political regions desiring to prohibit the use of subscriber units, and the like.

It will be apparent to those skilled in the art that the disclosed invention may be modified in numerous ways and may assume many embodiments other than the preferred form specifically set out and described above.

What is claimed is:

1. A method of mitigating electromagnetic interference during a scheduled radio astronomy session as scheduled at a radio astronomy site, said electromagnetic interference created by operating a satellite-based communication system, said method comprising the steps of:

(a) requesting interference mitigation services for said scheduled radio astronomy session from a radio astronomy site to a ground control station;

(b) transmitting a mitigation timetable from said ground control station to radio astronomy special equipment;

(c) receiving said mitigation timetable at said radio astronomy special equipment;

(d) activating said radio astronomy special equipment located at said radio astronomy site according to said mitigation timetable for mitigating said electromagnetic interference during said scheduled radio astronomy session; and (e) inhibiting said electromagnetic interference from a subscriber unit of said satellite-based communication system, said subscriber unit located within a protection zone encompassing said radio astronomy site.

2. A method as recited in claim 1, wherein step (a) comprises the steps of:

(a1) determining at said radio astronomy site a start time for said scheduled radio astronomy session;

(a2) determining at said radio astronomy site a duration for said scheduled radio astronomy session; and (a3) communicating said start time and said duration of said scheduled radio astronomy session to said ground control station of said satellite-based communication system.

3. A method as recited in claim 2, wherein step (d) comprises the steps of:

(d1) evaluating said start time of said mitigation timetable for commencement of mitigation services;

(d2) upon arrival of said start time, activating said radio astronomy special equipment;

(d3) said radio astronomy special equipment transmitting a control signal about said radio astronomy site; and (d4) said radio astronomy special equipment remaining activated throughout said duration of said scheduled radio astronomy session.

4. A method as recited in claim 1, wherein step (b) comprises the steps of:

(b1) constructing a mitigation timetable at said ground control station;

(b2) scheduling transmission of said mitigation timetable; and (b3) transmitting said mitigation timetable from said ground control station to said radio astronomy special equipment through a communication channel.

5. A method as recited in claim 1, wherein step (c) comprises the steps of:

(c1) monitoring a communication channel of said satellite-based communication system for said mitigation timetable directed to said radio astronomy special equipment;

(c2) said radio astronomy special equipment receiving said mitigation timetable from said communication channel of said satellite-based communication system; and (c3) storing said mitigation timetable in said radio astronomy special equipment.

6. A method as recited in claim 1, wherein step (d) further comprises the steps of:

(d5) informing said radio astronomy site from said radio astronomy special equipment of commencement of said interference mitigation services; and (d6) signifying to said radio astronomy site from said radio astronomy special equipment a mitigation period defining minimization of said electromagnetic interference from said satellite-based communication system.

7. A method as recited in claim 1, wherein step (e) comprises the steps of:

(e1) said subscriber unit receiving a control signal on a control channel from said radio astronomy special equipment;

(e2) said subscriber unit in response to reception of said control signal prohibiting transmission of said electromagnetic interference; and (e3) continuing to prohibit said electromagnetic interference during said scheduled radio astronomy session.

* * * * *